United States Patent [19]

Kurita et al.

[11] 3,765,166
[45] Oct. 16, 1973

[54] BALANCE CONSTRUCTION FOR ELECTRONIC TIMEPIECES

[75] Inventors: Hirohisa Kurita; Hiroaki Fujimori; Yasuo Fujisawa, all of Shimosuwa-machi, Japan

[73] Assignee: Kabushiki Kaisha Suwa Seikosha, Tokyo, Japan

[22] Filed: Dec. 29, 1972

[21] Appl. No.: 319,437

[30] Foreign Application Priority Data
Dec. 29, 1971 Japan.................................. 46/1877

[52] U.S. Cl...................... 58/107, 58/28 A, 310/36
[51] Int. Cl. ........................ G04c 3/04, G04b 17/00
[58] Field of Search................. 58/28 R, 28 A, 107; 310/36

[56] References Cited
UNITED STATES PATENTS
3,670,492   6/1972   Takamune ............................ 58/107
3,161,012   12/1964   Hug et al. ............................ 58/28 A FOREIGN PATENTS OR APPLICATIONS
1,334,088   6/1963   France ................................ 58/28 B

*Primary Examiner*—Richard B. Wilkinson
*Assistant Examiner*—Edith Simmons Jackmon
*Attorney*—Alex Friedman et al.

[57]   ABSTRACT

A balance having a pair of essentially parallel balance wheels mounted on a common shaft for oscillation, and having permanent magnets mounted on said balance wheels, is provided with magnetic yoke members on each of said balance wheels formed with recesses for receiving said permanent magnets, the depth of said recesses being at least more than one-half the thickness of the permanet magnets. Further, said permanent magnets are positioned so that the distance between facing permanent magnets is equal to more than the least distance between the balance wheels.

7 Claims, 8 Drawing Figures

PATENTED OCT 16 1973 3,765,166

BALANCE CONSTRUCTION FOR ELECTRONIC TIMEPIECES

BACKGROUND OF THE INVENTION

This invention relates to improvements in moving-magnet type balances for electronic timepieces, wherein the interaction between a magnetic circuit on the balance and a coil serves to drive said timepiece. Generally, in such moving magnet-type balances, two balance wheels are mounted in parallel relation on a single balance shaft for common rotation and oscillation. A magnetic circuit is constructed by mounting permanent magnets on the opposed faces of said balance wheels. In some embodiments, the permanent magnets are mounted in apertures in the balance wheel and a magnetic yoke is mounted on the outer face of each of said balance wheels. The coil is positioned in the gap between the permanent magnets to effect driving of the electronic timepiece.

Ideally, a balance should not be affected by displacement with the timepiece, the stopping of the timepiece, external magnetic fields and the like. In particular, the isochronism of the balance should not be broken by magnetic interaction between parts positioned about the balance formed of magnetic material and the balance itself. Such magnetic interaction would be caused by leaks in the magnetic field produced by the magnetic circuit of the balance. Further, balances should be designed so that horizontal deflection or "unpoisedness" of the balance can be readily corrected during manufacuture. The prior art constructions have been characterized by these defects, and the arrangement in accordance with the invention seeks to avoid, to the extent possible, such defects.

SUMMARY OF THE INVENTION

Generally speaking, in accordance with the invention, a balance is provided having a pair of spaced balance wheels mounted in parallel relation on a balance shaft for common rotation and oscillation. The balance wheels are formed with a pair of apertures, a pair of permanent magnets being mounted in said apertures in each of said balance wheels in facing relation to the permanent magnets of the other of said balance wheels. The permanent magnets are of a polarity to define a magnetic circuit including a magnetic yoke member mounted on the outer face of said balance wheel. Said magnetic yoke members are formed with recesses for receiving the portions of said permanent magnets projecting through said balance wheel apertures, said recesses and permanent magnets being dimensioned so that said recesses are of a depth equal to more than one-half the thickness of said permanent magnets. Said permanent magnets are dimensioned and positioned so as not to project beyond the inner face of said balance wheels. Specifically, the distance between facing permanent magnets is at least equal to or more than the least distance between the facing balance wheels.

Accordingly, it is an object of this invention to provide a balance having improved isochronism, minimum leakage of magnetic field, minimum fluid resistance, and generally improved efficiency, quality and workability.

A further object of the invention is to provide a balance wherein unbalance can be readily corrected.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

Referring now to FIG. 1, one of the many embodiments of a conventional moving magnet-type balance is depicted. In said construction, a pair of balance wheels 1 are mounted in spaced relation on a common shaft 4. A permanent magnet 2 is mounted on the inner surface of each of said balance wheels in facing relation. The balance wheels are formed of a magnetic material and as more particularly shown in a schematic representation of FIG. 5 the polarity of the permanent magnet 2 is selected so as to define a magnetic circuit wherein flux flows in the gap between said permanent magnets. Since the balance wheels of FIG. 1 are formed of a magnetic material, they are apt to be affected by an external magnetic field, this external magnetic field causing disordered timing, stopping of the timepiece and the like.

Figure 2:
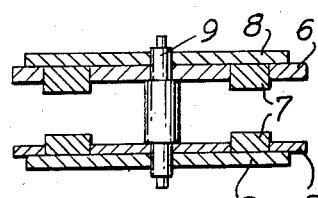
Figure 6:
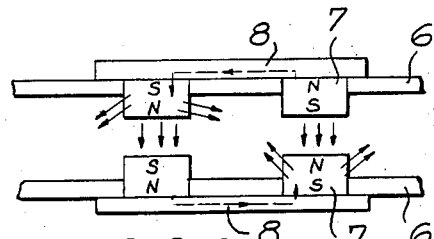

An attempt is made to overcome this difficulty by the conventional balance construction of FIG. 2, wherein balance wheels 6 are mounted in spaced relation on common shaft 9. Balance wheels 6 are formed of a non-magnetic material and permanent magnets 7 are mounted in apertures therethrough. A magnetic yoke member 8 is mounted on the outer surface of each of balance wheels 6 in engagement with the permanent magnets. Since the balance wheels are formed of a non-magnetic material, they are seldom affected by an external magnetic field. However, the material used for the balance wheels is such that the magnetic flux from the permanent magnets is not completely absorbed and leakage of the magnetic flux is relatively large. (See FIG. 6) This leakage causes isochronism due to the interaction between said leakage flux and magnetic members in the region of the balance such as a hairspring, screws, the stems of gears and the like.

Figure 1:
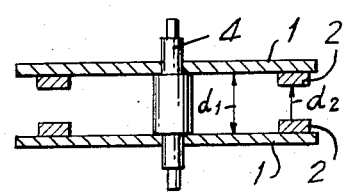
FIGS. 1 and 2 are cross-sectional views of conventional balance constructions.
Figure 5:
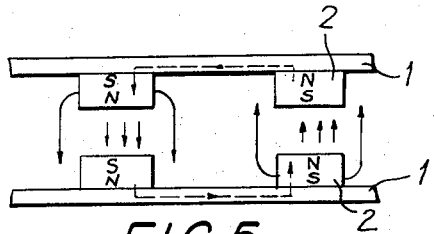
FIGS. 5 and 6 are schematic representations of the balance constructions of FIGS. 1 and 2, respectively, illustrating the magnetic circuits thereof.
Figure 7:
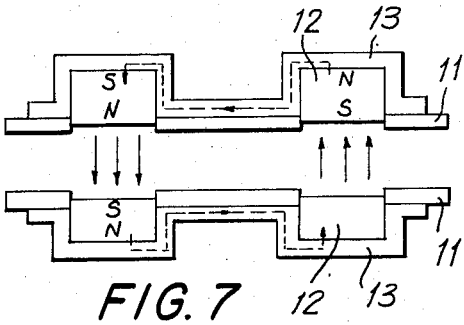
FIGS. 7 and 8 are schematic representations of the balances of FIGS. 3 and 4 illustrating the magnetic circuits thereof.

A further deficiency in the arrangements of FIGS. 1 and 2 results from the fact that the distance $d_1$ between opposite balance wheels is greater than the distance $d_2$ between facing permanent magnets. Specifically, the permanent magnets 2 of the embodiment of FIG. 1 and the permanent magnets 7 of the embodiment of FIG. 7 project into the space between the balance wheels. This causes horizontal deflection of the balance during oscillation. It has proved difficult to provide a guide means for preventing such horizontal deflection. A further difficulty in the prior art constructions is the difficulty of correcting the balance or "unpoisedness" of such structures. Since the permanent magnets project into the space between the balance wheels, it is difficult to eliminate unbalance from the outside of said balance by means of a milling cutter.

Figure 3:
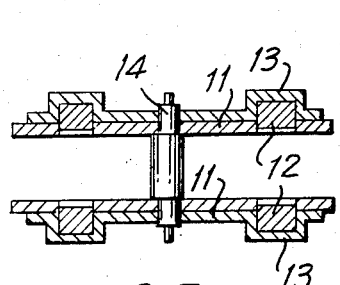
FIGS. 3 and 4 and cross-sectional views of balance constructions in accordance with the invention.

These defects are avoided by the arrangement in accordance with the invention, a first embodiment of which is depicted in FIG. 3. In said embodiment, a pair of balance wheels 11 formed of non-magnetic material are fixed to a balance shaft 14 so as to be parallel with each other. The balance wheels are formed with a pair of apertures therethrough for receiving permanent magnets 12. Each of the balance wheels is provided with a magnetic yoke member 13 mounted on the outside of said balance wheels and provided with recesses in registration with the apertures in said balance wheels for receipt of said permanent magnets. The recesses in yoke members 13 are dimensioned so as to have a depth equal to at least more than one-half the thickness of the permanent magnets 12. Such recesses can be readily formed by stamping a thin plate formed of magnetic material. As shown in the schematic representation of FIG. 7, leakage of magnetic flux is substantially lessened in the arrangement in accordance with the invention since the permanent magnets are surrounded by the magnetic yoke member and the contact area therebetween is large in comparison with that of the conventional structure. A shallow recess provided merely for locating the permanent magnets would be insufficient to reduce the leakage of the magnetic flux.

Figure 4:
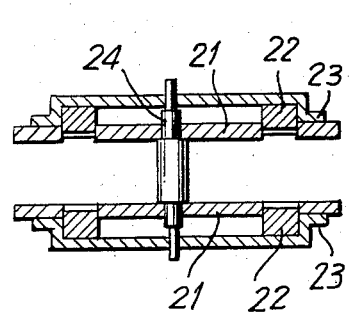
Figure 8:
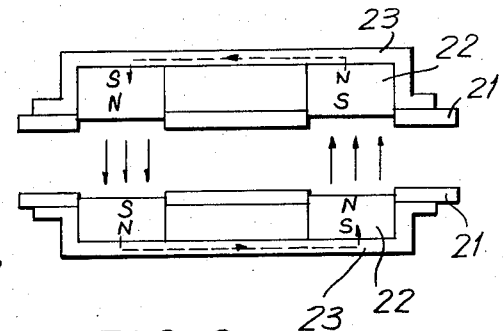

The second embodiment of the arrangement depicted in FIG. 4 is substantially identical to the embodiment of FIG. 3 except that a single large recess is formed in each of magnetic yoke members 23 so as to encompass both permanent magnets 22 on each balance wheel 21. The magnetic circuit of this embodiment is depicted schematically in FIG. 8.

Both of the embodiments of FIGS. 3 and 4 are characterized by the fact that the permanent magnets do not project beyond the surface of the balance wheels. Specifically, the distance $d_1$ between opposite balance wheels is less than or equal to the distance $d_2$ between facing permanent magnets.

The arrangement in accordance with the invention improves isochronism, the anti-magnetic character of the balance, as well as the accuracy and stability thereof. Since the balance wheels are formed of a non-magnetic material, they are seldom affected by an external magnetic field. The substantial reduction in the leakage of magnetic flux prevents magnetic interaction with magnetic members mounted in the region of the balance. The overall cost of the balance is reduced since a magnetic shield for insuring such anti-magnetic character is not required. The endurance of the entire timepiece may be improved since magnetic materials such as steel, having excellent strength and manufacturing characteristics, may be employed in the region about the balance without substantial concern for magnetic interaction. Further, the arrangement in accordance with the invention does not require additional parts.

A further advantage of the arrangement in accordance with the invention is that the inner surface of each of the balance wheels is rendered substantially flat without undue complication of the balance wheel structure. This prevents loss of vibrating energy due to fluid resistance, which would otherwise be caused by the projection of the permanent magnets into the space between the balance wheels. The arrangement in accordance with the invention facilitates the mounting of the balance wheel on the balance shaft and aids in the avoidance of horizontal deflection of the balance wheels.

Further, the balancing of the balance can be readily achieved, unbalance being readily eliminated during manufacture by means of a milling cutter, this improvement directly resulting from the smooth inner surface of the balance wheels. Accordingly, the arrangement in accordance with the invention produces a balance having improved efficiency, quality and workability.

It will thus be seen that the objects set forth above, among those made apparent from the preceding description, are efficiently attained and, since certain changes may be made in the above constructions without department from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A balance comprising a shaft; a pair of substantially parallel balance wheels mounted on such shaft for rotational oscillation, said balance wheels each being provided with a pair of apertures therethrough in facing aligned relation; a pair of permanent magnets mounted in the apertures of each of said balance wheels, said permanent magnets being of a polarity to define a magnetic circuit with magnetic flux passing in the gap therebetween; and a magnetic yoke member mounted on the outer surface of each of said balance wheels, said magnetic yoke members being formed with recesses in registration with the apertures in said balance wheels for receiving portions of said permanent magnets projecting beyond said balance wheels, said recesses being of a depth equal to more than one-half the thickness of said permanent magnets.

2. A balance as recited in claim 1, wherein each of said magnetic yoke members is formed with a pair of recesses, each of said recesses being in registration with one of said apertures in the corresponding balance wheel.

3. A balance as recited in claim 1, wherein each of said magnetic yoke members is formed with a single recess encompassing both of said apertures in the corresponding balance wheel.

4. A balance as recited in claim 1, wherein the permanent magnets do not project beyond the inner surface of the respective balance wheels.

5. A balance as recited in claim 1, wherein the spacing between facing permanent magnets mounted on said balance wheels is equal to or greater than the least spacing between the opposed balance wheels.

6. A balance as recited in claim 1, wherein said balance wheels are formed of a non-magnetic material.

7. A balance comprising a shaft; a pair of substantially parallel balance wheels mounted on said shaft for rotational oscillation, said balance wheels being provided with a pair of apertures therethrough in facing aligned relation; and a pair of permanent magnets mounted in the apertures of each of said balance wheels, said permanent magnets being of a polarity to define a magnetic circuit with magnetic flux passing in the gap therebetween, said permanent magnets being positioned in said apertures so that the distance between opposed facing permanent magnets is equal to or greater than the least spacing between said balance wheels.

* * * * *